United States Patent [19]

Fogelberg

[11] 4,083,419
[45] Apr. 11, 1978

[54] AUTOMATIC FOUR-WHEEL DRIVE TRANSFER CASE

[75] Inventor: Mark John Fogelberg, Muncie, Ind.

[73] Assignee: Borg-Warner Corporation, Chicago, Ill.

[21] Appl. No.: 716,629

[22] Filed: Aug. 23, 1976

[51] Int. Cl.² .................. B60V 17/26; B60V 17/34
[52] U.S. Cl. .................. 180/44 R; 74/665 T; 74/711; 192/44; 192/45; 192/48.92
[58] Field of Search ........... 180/49, 44 R; 192/31, 192/35, 36, 43, 44, 45; 74/665 F, 665 G, 665 S, 665 T, 665 K, 711

[56] References Cited

U.S. PATENT DOCUMENTS

| 1,290,031 | 1/1919 | Adler | 192/50 |
|---|---|---|---|
| 2,699,852 | 1/1955 | Cost | 192/46 |
| 2,796,941 | 6/1957 | Hill | 180/44 R |
| 3,221,574 | 12/1965 | Sampietro | 74/665 |
| 3,283,611 | 11/1966 | Weismann | 74/650 |
| 3,295,625 | 1/1967 | Ordorica | 180/44 R |
| 3,300,002 | 1/1967 | Roper | 192/35 |
| 3,481,436 | 12/1969 | Wilkowski | 192/35 |
| 3,584,713 | 6/1971 | Tani | 180/44 R X |

FOREIGN PATENT DOCUMENTS

| 899,607 | 6/1945 | France | 180/44 R |

Primary Examiner—Joseph F. Peters, Jr.
Assistant Examiner—John P. Silverstrim
Attorney, Agent, or Firm—Julian Schachner

[57] ABSTRACT

A power transfer mechanism incorporated in a multiple path drive system comprises a transfer case disposed between a source of input torque and a pair of drive axles. The torque is transferred directly to the fixed axle and is transferred automatically to the steering axle through a double-acting overrunning clutch when required. The clutch is biased toward one engaged position and is prevented from locking inadvertently in the other engaged position by a direction-sensitive blocking device. Action of this device is timed in order to insure proper blocking.

12 Claims, 6 Drawing Figures

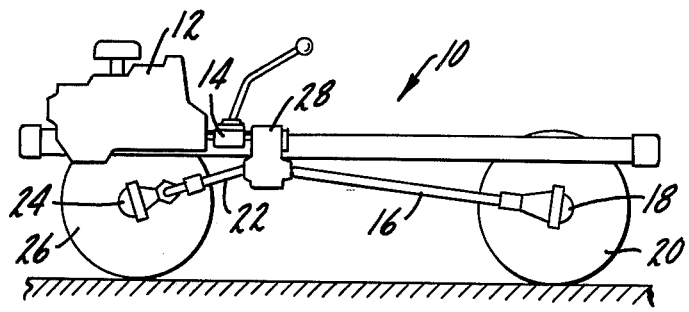
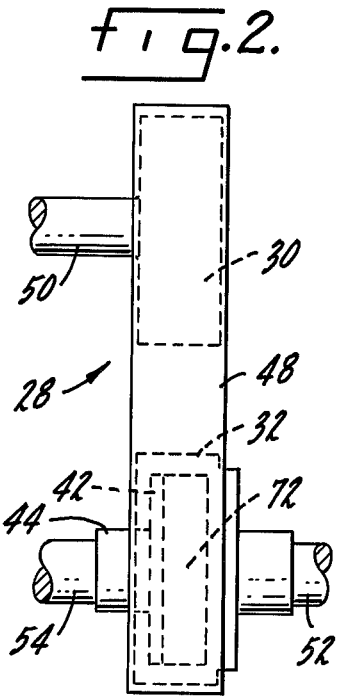

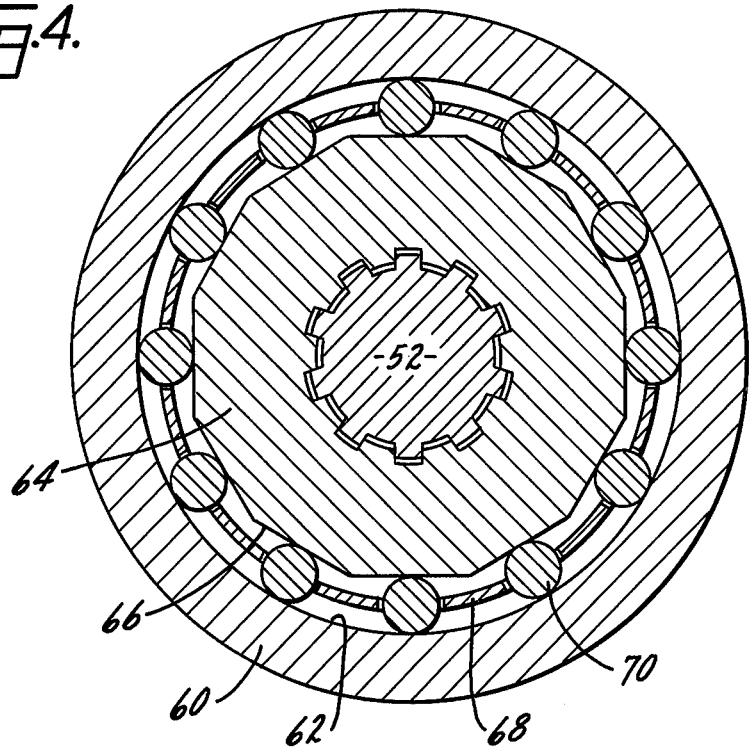
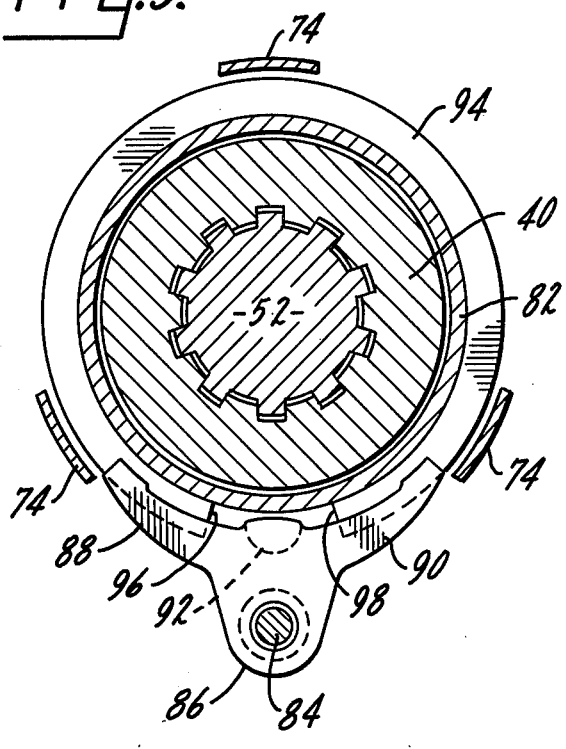
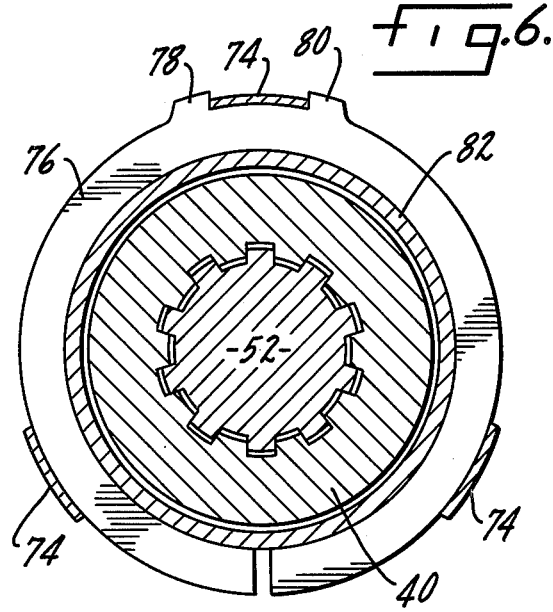

AUTOMATIC FOUR-WHEEL DRIVE TRANSFER CASE

BACKGROUND OF THE INVENTION

This invention relates generally to a power transfer mechanism adapted to be incorporated in a multiple path drive system, for example a four-wheel drive vehicle. More particularly, it relates to a torque transfer case adapted to receive torque from a prime mover and to provide torque for one drive axle when two-wheel drive is adequate and to provide torque for both drive axles automatically when four-wheel drive is required. The torque transfer case incorporates a double-acting overrunning clutch for automatically engaging and disengaging the four-wheel drive function.

In recent years there have been many improvements in automotive drive trains, including improvements relating to the transfer of torque from a prime mover to drive axles. Where four-wheel drive systems are used, transfer cases have been developed which direct torque to one output to drive a fixed axle and through an overrunning clutch to another output for driving a steering axle. The clutch automatically engages and disengages the four-wheel drive function. However, an excessive overrunning condition may cause undesirable clutch lockup, thus negating its automatic function. One attempt at a solution to this problem was the use of a speed-sensitive blocking structure, as disclosed in U.S. application Ser. No. 615,001 filed Sept. 19, 1975. It was then found that an excessive overrunning condition may obtain at speeds below the threshold speed of such a structure. Thus, there was still a need to provide an overrunning clutch which engages and disengages automatically, but which prevents undesirable engagement even at low speeds. This need now is believed to have been met by a blocking structure which is direction-sensitive rather than speed-sensitive. Such a direction-sensitive blocking structure is disclosed in U.S. application Ser. No. 691,672 filed June 1, 1976, which application is a continuation-in-part of U.S. application Ser. No. 637,923 filed Dec. 5, 1975.

Subsequently, it was found that under certain operating conditions there is a tendency for the fixed axle wheels to skid, with consequent loss of vehicle control. As disclosed in U.S. application Ser. No. 676,774 filed Apr. 14, 1976, this tendency may be corrected by providing sufficient drive back from the steering axle wheels to keep the fixed axle wheels rotating. Drive may be established between the axles independently of the clutch by loosely connecting one clutch race element with the steering axle, and by providing frictional engagement between this element and the fixed axle.

As a result of the action of such friction drive, undesirable clutch lockup in the wrong engaged position can occur when, for example, the vehicle is brought to a stop in a turning configuration and more than a single direction reversal is initiated. This can occur notwithstanding incorporation in the clutch of blocking devices known heretofore.

SUMMARY OF THE INVENTION

This invention is directed to an improved four-wheel drive system including a transfer case of the type having an overrunning clutch therein which includes means to eliminate the aforementioned undesirable clutch lockup. The transfer case is adaptable for transferring torque from an input directly to fixed (herein called rear) axle wheels and through the overrunning clutch to steering (herein called front) axle wheels. When the rear wheels lose traction in either direction of rotation, the overrunning clutch effectively engages and torque is transferred to both axles, thereby establishing a four-wheel drive condition. When traction is restored to the rear wheels, the overrunning clutch effectively disengages and the system reverts back to a two-wheel drive condition.

The transfer case includes a front output incorporating an outer clutch race of cylindrical configuration. A rear output incorporates an inner clutch race having a plurality of ramp surfaces, each associated with a roller carried by a roller cage. Frictional bias for the roller cage is provided by a drag ring rotatable with the roller cage and adapted for frictional engagement with the transfer case housing.

A drive path is provided from the front axle to the rear axle independently of the overrunning clutch. The outer race element is loosely connected to the front output and is in frictional engagement with the rear output for transferring torque back from front to rear. This establishes a drive path from the front wheels to the rear wheels in parallel with the overrunning clutch, but separate therefrom. As a result, sufficient power is transferred to the rear wheels to keep them rolling when required to overcome any tendency of the rear wheels to skid.

With a double-acting overrunning roller clutch incorporated in the system, it is desirable to guard against undesirable clutch engagement. This is accomplished by a direction-sensitive blocking device which prevents undesirable roller movement through the central or freewheel position. The device is frictionally biased by a drag ring adapted for frictional engagement with the transfer case housing. Upon movement of the vehicle, a drag force is developed which causes an element of the device to pivot in the path of the roller cage, thereby preventing undesirable movement of the cage and its associated rollers across the central position. The relationship of the element and drag ring is such that there is lost motion therebetween. In the event torque is applied during direction reversals with the vehicle stopped, this relationship insures that the cage and its associated rollers are in their proper position, thus preventing undesirable clutch engagement. The device is direction-sensitive and operates in either direction of rotation, without regard to the speed of rotation.

Thus, the requirements of various vehicle manufacturers for improved automatic four-wheel drive power trains may be satisfied with a simplified and economical assembly, as will be described.

BRIEF DESCRIPTION OF THE DRAWINGS

The objects and advantages of this invention will become apparent to those skilled in the art upon careful consideration of the specification herein, including the drawings, wherein:

FIG. 1 is a schematic view of the four-wheel drive vehicle;

FIG. 2 is a schematic view of the torque transfer case;

FIG. 3 is a sectional view showing details of the double-acting overrunning clutch incorporated in the torque transfer case;

FIG. 4 is a sectional view taken along the line 4—4 of FIG. 3 showing additional details of the double-acting overrunning clutch;

FIG. 5 is a sectional view taken along the line 5—5 of FIG. 3 showing details of the blocking structure; and FIG. 6 is a sectional view taken along the line 6—6 of FIG. 3 showing details of the biasing structure.

While this invention is susceptible of embodiment in many different forms, there is shown in the drawings and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, there is shown generally in FIG. 1 a multiple path drive system in the form of a four-wheel drive vehicle 10 having a prime mover 12 in driving relationship with a suitable transmission 14. A propeller shaft 16 is in driving engagement with a fixed axle assembly 18, which in turn supports a pair of ground-engaging wheels 20. Another propeller shaft 22 is in driving engagement with a steerable axle assembly 24, which in turn supports a pair of ground-engaging wheels 26. A torque transfer case 28 is in engagement with transmission 14 for receiving torque from prime mover 12, and is in engagement with propeller shafts 16 and 22 respectively for transmitting torque to ground-engaging wheels 20 and 26.

As shown in FIGS. 2, 3 and 4, transfer case 28 includes a first sprocket 30 and a second sprocket 32. Sprocket 32 defines an interior pocket 34 and includes a flange 36 which in turn defines a plurality of openings 38 extending therethrough and spaced around its periphery to communicate pocket 34 with the exterior thereof. Sprocket 32 also includes an annular extension 40 extending outwardly from flange 36. Also forming a portion of sprocket 32 is a flange 42 having an annular extension 44 extending outwardly therefrom. Flange 42 is secured to sprocket 32 by means of a locking ring 46 or the like. A suitable chain 48 couples sprockets 30 and 32. Sprocket 30, chain 48 and sprocket 32 form a chain drive train.

An input shaft 50 extends into transfer case 28 and is engaged with sprocket 30. Input shaft 50 is adapted to receive torque, for example, from associated manual or automatic transmission 14 of automotive vehicle 10. It should be understood that input shaft 50 may be the output shaft of such a transmission.

A rear output shaft 52 is engaged with propeller shaft 16 and extends into transfer case 28. Output shaft 52 is splined to extension 40 of sprocket 32. A front output shaft 54 is engaged with propeller shaft 22 and extends into transfer case 28. Output shaft 54 defines an upstanding flange 56 which is engaged by means of a loose spline connection 58 with an annular extension 60 within pocket 34 of sprocket 32. Extension 60 defines an outer clutch race 62 of cylindrical configuration.

An annular element or cam 64 is splined to output shaft 52. Cam 64 is within pocket 34 and defines an inner clutch race 66 comprising a plurality of flats or ramp surfaces.

An annular cage 68 supports a plurality of wedging elements 70, one of which is associated with each flat of inner race 66. Extension 60, cam 64, races 62 and 66, cage 68 and wedging elements 70 comprise together a double-acting overrunning clutch or freewheel device 72. In one preferred form of the invention, wedging elements 70 are rollers, and clutch 72 is a roller clutch.

As shown in FIGS. 3 and 6, roller cage 68 defines a plurality of fingers 74 extending through openings 38 of sprocket 32. Fingers 74 are in frictional contact with a drag ring 76. Drag ring 76 defines a pair of spaced projections 78 and 80 for engagement by a finger 74 such that drag ring 76 is rotated with fingers 74 as roller cage 68 rotates. A wear ring 82 is press fit to the housing of transfer case 28 for frictional contact by drag ring 76, so as to establish smooth frictional engagement therewith. As a result, balanced radial forces are developed which cause a relative drag effect on roller cage 68.

Turning now to FIGS. 3 and 5, the direction-sensitive blocking mechanism includes a pin 84 secured to flange 36 of sprocket 32, and a rocker element 86 pivotally supported by pin 84. Element 86 includes a pair of arms 88 and 90 and a projection 92. A drag ring 94 is in frictional contact with wear ring 82, so as to establish smooth frictional engagement with the housing of transfer case 28. Drag ring 94 is spaced from fingers 74 of roller cage 68.

Drag ring 94 is cut away adjacent projection 92 of element 86, thereby defining spaced ends 96 and 98. In one preferred form of the invention, ends 96 and 98 form a gap of approximately 30° to 40° in drag ring 94 adjacent projection 92. In effect, this develops a lost motion connection between projection 92 and drag ring 94.

A drive-back mechanism is shown in FIG. 3 and includes a Belleville spring 100 interposed between flange 42 of sprocket 32 and extension 60 of clutch 72. Belleville spring 100 applies an axially directed biasing force to extension 60. As extension 60 is engaged with output shaft 54 by means of loose spline connection 58, the biasing force of Belleville spring 100 tends to move extension 60 axially relative to output shaft 54. An annular friction pad 102 is interposed between extension 60 and flange 36 of sprocket 32. The biasing force of Belleville spring 100 tends to urge extension 60 into contact with friction pad 102, which in turn is in contact with flange 36. This results in the establishment of a friction drive path between output shafts 52 and 54, which drive path is in parallel with the drive path established through clutch 72. The friction drive path is independent of the clutch drive path.

In operation, torque is received by input shaft 50 and is transferred through the chain drive train to drive output shaft 52. Output shaft 52 is connected through propeller shaft 16 to drive fixed rear axle assembly 18 and its associated wheels 20. Output shaft 54 is connected through propeller shaft 22 to drive steerable front axle assembly 24 and its associated wheels 26.

The aforementioned U.S. application Ser. No. 676,774 teaches that extension 60 need not overrun cam 64 in order for clutch 72 to be effective, as clutch 72 is a freewheel device. It should be understood, however, that overrun may be built into clutch 72 if desired. In any event, extension 60 inherently rotates faster than cam 64 when the vehicle is turning, since the front wheels travel through a larger radius than do the rear wheels.

With reference to FIG. 4, assume output shaft 52 and cam 64 are rotating in the clockwise direction. Output shaft 54 and extension 60 also rotate in the clockwise direction, but tend to overrun. The drag effect on roller cage 68, developed by the frictional engagement of drag ring 76 with wear ring 82, causes rollers 70, in effect, to rotate relatively in the counterclockwise direction. Rollers 70 tend to wedge between inner race 66 and outer race 62 so as to engage clutch 72. However, due to the fact that extension 60 tends to overrun cam 64, a force is developed which acts on rollers 70 such that they will tend to be carried in the clockwise direction, relatively, away from their engaged position. This effectively prevents engagement of clutch 72. As a result, torque is transferred to output shaft 52 but not to output shaft 54. In this condition, the operation is essentially that of a conventional two-wheel drive vehicle.

When the rear wheels lose traction, output shaft 52 will speed up. The drag effect on roller cage 68 will cause rollers 70 effectively to wedge between inner race 66 and outer race 62. When this takes place, torque will be transferred both to output shaft 52 and through clutch 72 to output shaft 54. In this condition, the operation is essentially that of a conventional four-wheel drive vehicle in locked-up mode.

When the rear wheels regain traction, output shaft 52 will slow down, and output shaft 54 will again tend to overrun output shaft 52, thereby effectively disengaging clutch 72 and restoring the vehicle to the two-wheel drive condition. Thus, it will be seen that the transfer case provides for establishment of four-wheel drive automatically, as required, and for establishment of two-wheel drive automatically when four-wheel drive is not required. This automatic engaging and disengaging feature is provided when the vehicle is moving in either the forward or reverse directions; that is, when output shafts 52 and 54 are rotating in either the clockwise or counterclockwise directions as shown in FIG. 4.

Relative rotation between extension 60 and cam 64, with extension 60 overspeeding, prevents clutch 72 from engaging by causing rollers 70 to move slightly, relatively away from a wedging position on clutch races 62 and 66. This results in slight rotational displacement of cage 68 toward the central position.

Excessive overspeed of extension 60 could pull cage 68 and rollers 70 beyond the central position into a clutch engaging position on the opposite side of cam 64. This may occur under unusual operating conditions. For example, a tire blowout would cause the rolling radius of that wheel to become suddenly reduced. Such changes in the characteristics of a vehicle driveline would create a potentially dangerous condition. Similarly, shocks due to jerks, bumps, etc. could cause instantaneous excessive overspeed sufficient to pull the rollers beyond the freewheel position to create the same potential danger. Centrifugal force effects on the rollers tend to pull them, and the cage, toward the opposite side of the cam. While enough friction on the cage to prevent this could be built into the system, the amount required would be wasteful of power and could lead to excessive wear under normal operating conditions. The direction-sensitive blocking mechanism prevents such inadvertent movement of rollers 70 at all speeds, as taught in the aforementioned U.S. application Ser. No. 691,672.

The direction-sensitive blocking mechanism disclosed herein is operable independently of speed. Initial vehicle movement causes rotation of sprocket 32 to drive output shaft 52 and cam 64. Pin 84, secured to flange 36 of sprocket 32, rotates therewith and with cam 64. Element 86 is carried with pin 84. Drag ring 94, engaged with projection 92 by a lost motion connection, tends to lag pin 84 due to its frictional contact with wear ring 82. As a result, element 86 is picked up by end 96 or 98 of drag ring 94 and pivoted about pin 84, and either arm 88 or 90 is moved into the path of rotational displacement of fingers 74, depending on the direction of vehicle movement. In this position, fingers 74 have limited freedom of movement such that cage 68 and rollers 70 are movable between clutch engaging and disengaging positions, but are not movable beyond the central position toward the opposite clutch engaging position.

As taught in the aforementioned U.S. application Ser. No. 676,774, the drive-back mechanism overcomes undesirable characteristics found under certain operating conditions. When going downhill on loose terrain, such as gravel or the like, in low gear, there may be enough engine braking to overcome the friction between the tires and the ground surface. At such times, the rear wheels break away; that is, they lose rolling contact with the surface and go into a skid. The same thing could happen on a level road in the coast mode of operation on a slippery surface, such as ice or the like. On ice, it could happen in high gear. In other words, whenever there is developed greater engine braking than the rear wheels can absorb alone, they will skid with consequent loss of vehicle directional control. This result is more apparent in a vehicle with a manual transmission than in one with an automatic transmission having a fluid member. The problem may be solved by providing a drive path back from front to rear in order that the front wheels keep the rear wheels rolling in the coast mode of operation, so as to overcome any tendency of the rear wheels to skid.

Such a drive path is provided from output shaft 54 through flange 56, extension 60 and flange 36 to output shaft 52. Belleville spring 100 provides a biasing force tending to establish frictional engagement between extension 60 and flange 36 through friction pad 102. It is desirable to keep the amount of torque transferred back as low as possible so as not to introduce significant inefficiency into the system in the drive mode of operation.

It is now known that the torque transferred by the drive-back mechanism may interfere with effective operation of the blocking device and allow undesirable clutch engagement when, for example, the vehicle is in a turning configuration, causing front-wheel overrun. This may be considered to impose a negative torque in the front driveline equal to that of the friction bias built into the clutch. When the vehicle is stopped, this torque remains in the front driveline due to the torsional elasticity of the driveline components. Similarly, a positive torque remains in the rear driveline.

If, as can be done easily with an automatic transmission, a direction reversal is initiated without allowing the vehicle to move, i.e., with the brakes applied, a negative torque will be applied to the rear driveline. The residual positive torque in the rear driveline will be relieved and cam 64 will be displaced rotationally by an amount sufficient to wedge rollers 70 on the opposite side thereof. Rollers 70 will transfer negative torque in excess of the amount absorbed by the friction bias mechanism. They will remain in this position until this excess torque is eliminated. Without a delay in the action of the blocking device, this slight rotational displacement of cam 64 would be sufficient to shift the blocking device, thus trapping rollers 70 on the opposite side of cam 64.

If another direction reversal is initiated, a positive torque again will be applied to the rear driveline. However, due to the torque developed by the driveback mechanism, resulting from its own frictional bias, rollers 70 will remain trapped on the opposite side of cam 64 so long as the vehicle is not allowed to move.

If, as is likely, the vehicle now is allowed to move, i.e., the brakes are released, rollers 70 will remain trapped on the opposite side of cam 64 by the tendency of the front wheels to overrun (the vehicle still may be in a turning configuration).

Such interference with effective operation is prevented by delaying the action of the blocking device until significant rotational displacement of cam 64 takes place, more than would take place by a direction reversal with the brakes applied. As noted above, this is accomplished by providing a gap in drag ring 94 to establish a lost motion connection with element 86. A gap of approximately 30 to 40 degrees is enough to delay shifting of the blocking device long enough to prevent rollers 70 from wedging on the opposite side of cam 64 upon the first-direction reversal noted above.

The loose spline connection 58, by which flange 56 is engaged with extension 60, aggravates the interference. Thus, the size of the gap in drag ring 94 should be adjusted to compensate for this, as well as to give the desired blocking delay in accordance with whatever particular clutch design is employed.

It should be understood that while a preferred embodiment of the invention has been shown and described, this is illustrative and may be modified by those skilled in the art without departing from the scope thereof, which is to be limited only by the claims herein.

I claim:

1. In a four-wheel drive vehicle having a transfer case for transferring rotary motion from a source of power to front and rear pairs of traction wheels, said transfer case including a housing, an input shaft and front and rear output shafts rotatably supported in said housing, and means in said housing for transferring rotary motion from said input shaft to said output shafts, said transferring means coupling said input shaft with one of said output shafts and including an overrunning clutch coupled with the other of said output shafts, said clutch having first and second elements rotatable in response to rotation of said output shafts and respectively defining first and second clutch races, a roller cage, a plurality of rollers carried by said cage between said clutch races for relative movement between two clutch engaging positions, means biasing said rollers toward one of said clutch engaging positions upon rotation of one of said elements, rotation of said second element faster than said first element tending relatively to move said rollers away from said one engaging position, and means responsive to rotation of one of said elements for movement into position for preventing said relative movement of said rollers to the other of said clutch engaging positions, said preventing means being constructed and arranged to be non-responsive to initial rotation of said one element less than a predetermined distance and responsive to subsequent rotation thereof without regard to centrifugal force.

2. The invention of claim 1, said preventing means being movable in the path of said cage in response to said subsequent rotation of said one element, whereby said rollers are blocked from said relative movement to said other clutch engaging position, said rollers being movable relatively between said one clutch engaging position and a clutch disengaging position when said preventing means is in the path of said cage.

3. In power transmission apparatus comprising a first rotatable element defining a plurality of cam surfaces, a second rotatable element defining an annular surface, an annular cage, a plurality of rollers supported by said cage and subject to rotational displacement therewith relative to said elements between a central freewheel position and two positions in which said rollers are in wedging engagement with said surfaces, means for biasing said cage into rotational displacement toward one of said engaging positions, and means for blocking rotational displacement of said cage to the other of said engaging positions; the improvement wherein said blocking means comprises an arm pivotally supported by and rotatable with one of said elements, said arm being pivotal in the path of rotational displacement of said cage, and retarding means spaced from said arm, said arm being rotatable into engagement with said retarding means upon rotation of said one element for effecting pivoting of said arm to block said rotational displacement of said cage to said other engaging position.

4. Power transmission apparatus comprising a housing, first and second elements supported for rotation in said housing, wedging means subject to displacement relative to said elements between two positions in wedging engagement therewith, means in frictional contact with said housing for biasing said wedging means toward one of said engaging positions in response to rotation of one of said elements, and blocking means including an arm pivotally supported by said one element, and a friction member in frictional contact with said housing for pivoting said arm in response to rotation of said one element to block said displacement of said wedging means to the other of said engaging positions, said friction member being spaced from said arm to define a lost motion connection therewith.

5. The invention of claim 4, said biasing means biasing said wedging means toward said one engaging position in response to rotation of said one element in one direction and toward said other engaging position in response to rotation of said one element in another direction, said friction member being responsive to rotation of said one element in said one direction for pivoting said arm in one direction to block said displacement of said wedging means toward said other engaging position and responsive to rotation of said one element in said other direction for pivoting said arm in another direction to block said displacement of said wedging means toward said one engaging position.

6. Power transmission apparatus comprising a housing, a first element supported for rotation in said housing and defining a plurality of cam surfaces, a second element supported for rotation in said housing and defining an annular surface, an annular cage, a plurality of rollers supported by said cage and subject to rotational displacement therewith between a freewheel position and two positions in which said rollers are in wedging engagement with said surfaces, means for biasing said cage into rotational displacement toward one of said engaging positions, means tending to establish independent engagement between said first and second elements, and means movable in response to rotation of one of said elements relative to said housing for blocking rotational displacement of said cage toward the other of said engaging positions, said blocking means being constructed and arranged to delay blocking movement thereof during rotation of said one element less than a predetermined distance.

7. A torque transfer assembly comprising a housing, an input shaft and first and second output shafts supported for rotation in said housing, means coupling said input shaft with said output shafts for transfer of torque therebetween, said coupling means including an overrunning clutch having wedging means movable between two clutch engaging positions establishing torque transfer paths with said second output shaft, means for biasing said wedging means toward one of said clutch engaging positions, and means operable in response to rotation of one of said shafts for blocking movement of said wedging means to the other of said clutch engaging positions, said blocking means being constructed and arranged to be non-responsive to initial rotation of said one shaft less than a predetermined distance.

8. The invention of claim 7, said one shaft being said first output shaft.

9. The invention of claim 7, said blocking means being operable independently of the speed of rotation of said one shaft.

10. The invention of claim 7, said blocking means including first means movable to effect said blocking of said wedging means, and second means responsive to said rotation of said one shaft for effecting said movement of said first means, said first and second means defining a lost motion connection therebetween.

11. The invention of claim 10, said second means being in frictional contact with said housing for developing a frictional drag force in response to said rotation of said one shaft, thereby effecting said movement of said first means.

12. The invention of claim 11, said first means being pivotal in the path of said wedging means, said lost motion connection delaying pivotal movement of said first means during said initial rotation of said one shaft by said predetermined distance.

* * * * *